June 26, 1951  G. T. REICH  2,558,268
APPARATUS FOR PROCESSING FOODS
Filed Dec. 17, 1946  3 Sheets-Sheet 1
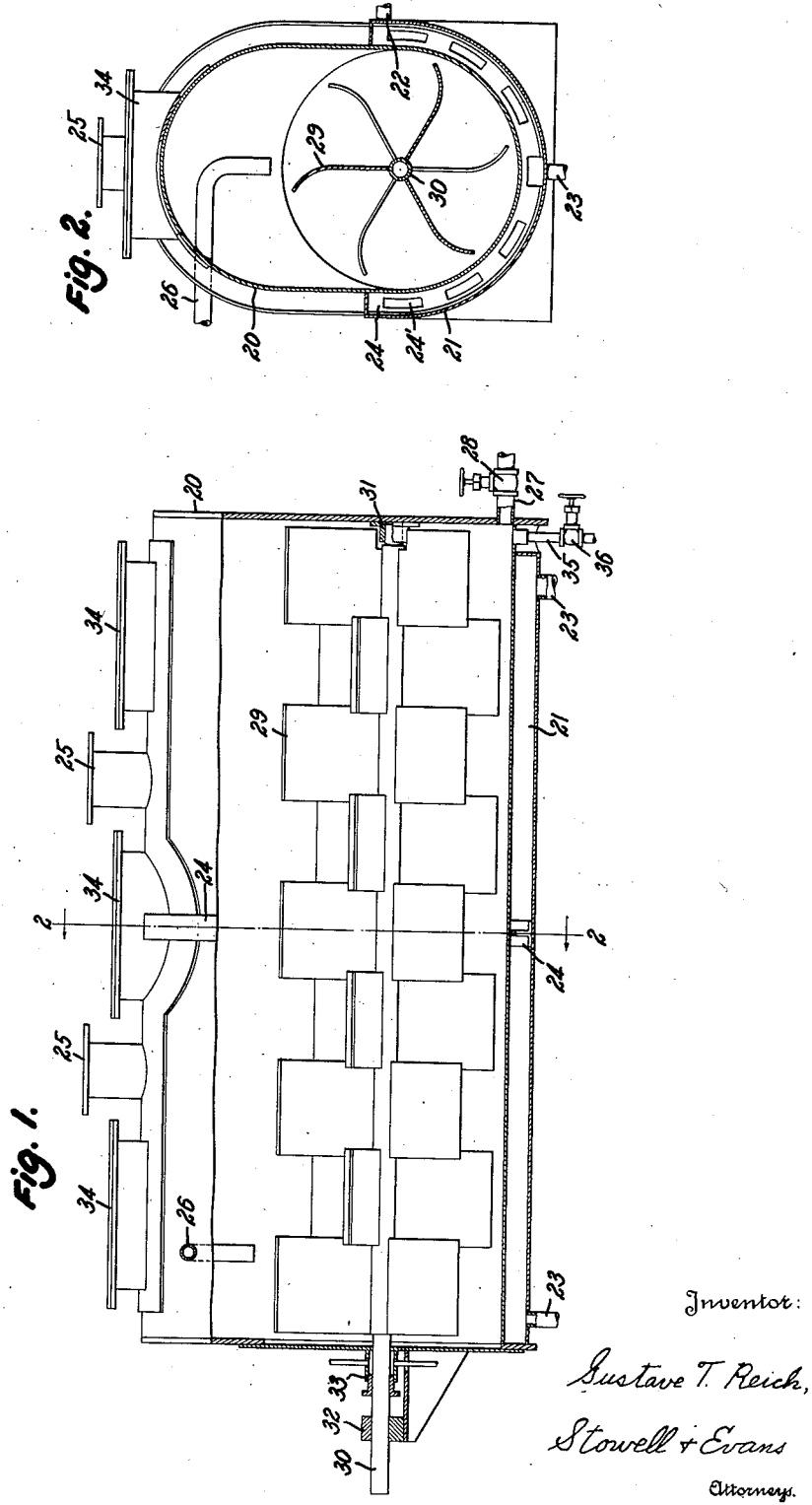
Inventor:
Gustave T. Reich,
Stowell & Evans
Attorneys.

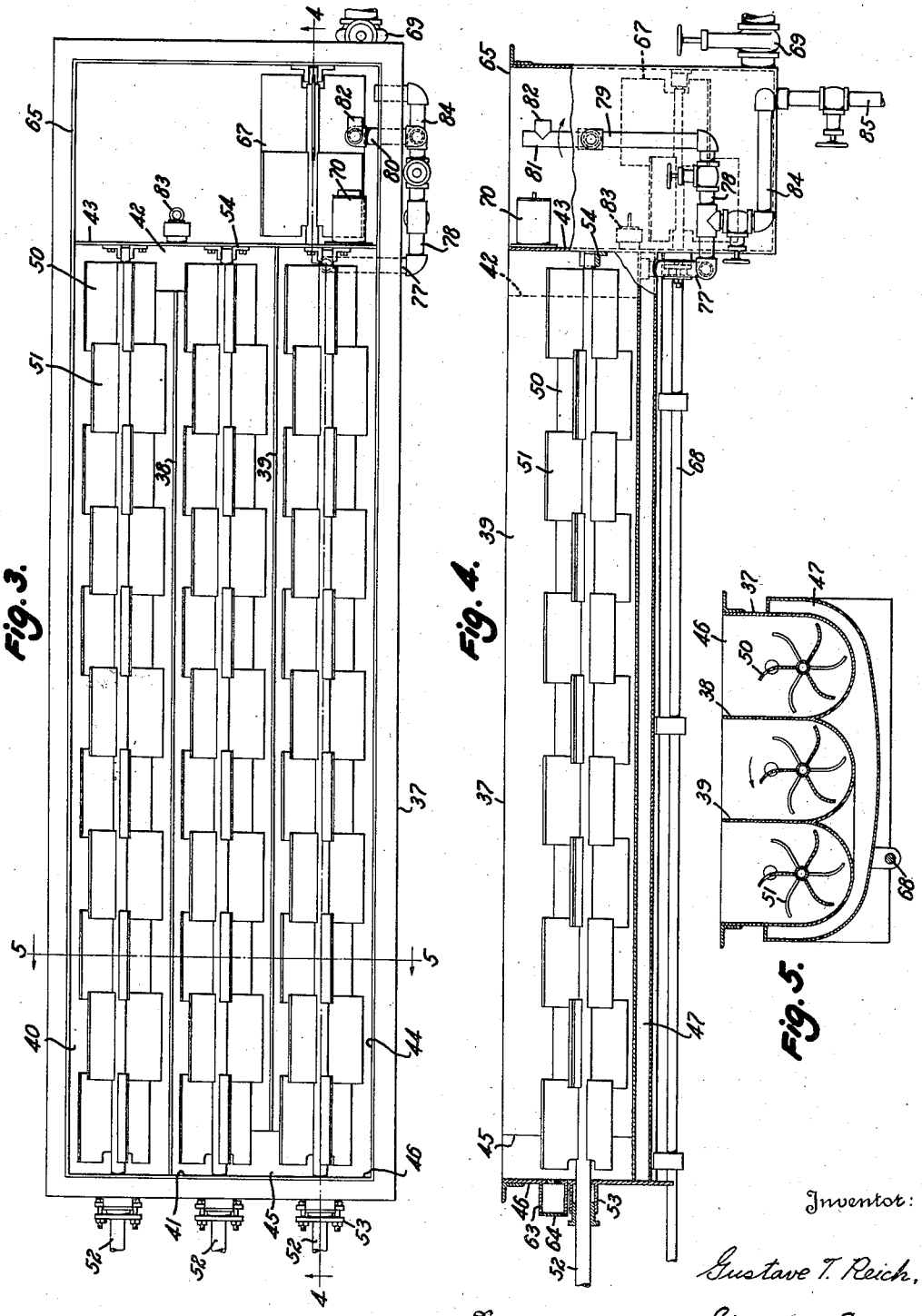

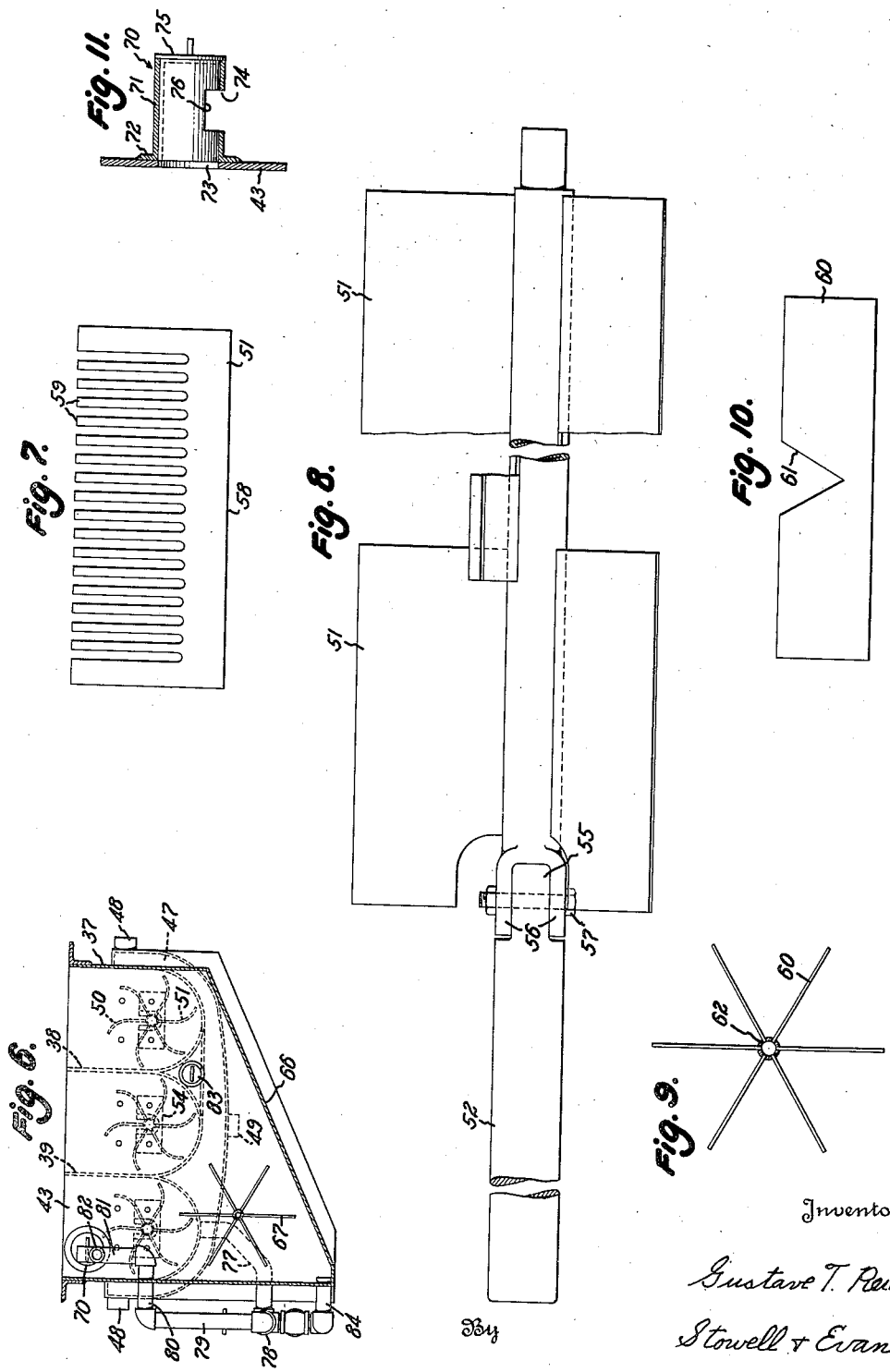

Patented June 26, 1951

2,558,268

UNITED STATES PATENT OFFICE 2,558,268

APPARATUS FOR PROCESSING FOODS

Gustave T. Reich, Philadelphia, Pa.

Application December 17, 1946, Serial No. 716,822

6 Claims. (Cl. 259—109)

This invention relates to apparatus for processing foods and more particularly to apparatus for making jams and jellies in accordance with the processes described in my prior Patents 2,105,064, issued December 26, 1939, and 2,353,784, issued July 18, 1944.

My above prior patents relate inter alia to methods of making jams, jellies and like foodstuffs wherein the steps of evaporation of the liquors and inversion of the sugar are carried out separately in order that each step may go forward under the most advantageous conditions. Typically, evaporation of the excess water from the liquors is first performed in a vacuum evaporator and, thereafter, the sugar is inverted below the boiling point of the liquors in a separate inversion tank.

The apparatus of the present invention may be employed to excellent advantage in the evaporative and inversion steps of the processes of my prior patents, but, of course, its use is not so limited.

An object of the invention is to provide a vacuum evaporator and an inversion tank for making jams, jellies and the like especially in large scale, continuous operations.

Another object is to provide apparatus for processing foodstuffs which is flexible permitting quick changes to be made from one type of product to another, as from jams to jellies or from one type of jam or jelly to another.

Another object is to provide apparatus capable of ready and accurate control of temperature, concentration of liquors, rate of inversion and other factors which must be accurately controlled if desirable products are to be obtained.

Another object is to provide an inversion tank from which coagulated albuminoids may be readily removed as scum for the production of a clear product.

A further object is to provide foodstuffs processing apparatus wherein the fruit, either whole or crushed as in preserves, jams and marmalades, is mixed uniformly with the jelly base, for example, fruit juice, sugar, pectin and acid, so that no separation occurs in the product.

Still another object is to provide apparatus which may be easily cleaned and maintained in a sanitary condition.

Other objects are to provide apparatus for the processing of foodstuffs having relatively low power requirements and consuming a minimum of steam for heating purposes; an apparatus capable of producing large output with a minimum of labor; and apparatus constructed and arranged to conserve floor space by incorporating a holding tank with the inversion tank.

Yet another object is to provide foodstuff processing apparatus producing a finished product of uniform and controlled quality and having superior flavor, aroma and consistency.

In its broader aspects the invention includes apparatus for processing fluent foods, particularly foods such as preserves and jams which contain suspended solids, a horizontal tank and a rotatable agitator in said tank, the agitator comprising a horizontal shaft and radially disposed agitator blades carried by the shaft, the outer ends of the blades being provided with elements curved in the direction of rotation of the shaft. The tank may be open to the atmosphere or it may be enclosed and provided with conduit means connecting the interior thereof with a barometric condenser or other source of vacuum.

In a more specific embodiment, the invention takes the form of apparatus for inverting jams and jellies comprising an elongated horizontal tank having an open top; means for heating the contents of said tank; an agitator in said tank comprising a horizontal shaft passing through one wall of said tank, journal means rotatably supporting said shaft in said one wall, a bearing carried by an opposite wall of said tank supporting the end of said shaft, means removably supporting said bearing in position, second journal means for said shaft positioned in said one wall above said journal means, removable closure means for said second journal means, and second means for removably supporting said bearing in an elevated position horizontally aligned with said second journal means; a holding tank adjacent to said opposite wall of said elongated tank, valved overflow means discharging processed material from said elongated tank into said holding tank; valved inverted siphon means for conducting processed material from the bottom of said elongated tank to the top of said holding tank; and joint means in said shaft located interiorly of said tank and near said journal means, whereby when said shaft is disengaged from said bearing it may be rotated upwardly about said joint to an elevated position facilitating cleaning of the agitator and tank. It will become apparent as the description proceeds that various subcombinations of the foregoing provide useful devices in the art of processing foodstuffs.

The invention will be described with greater particularity in the following detailed descrip-

3

Fig. 1 is a vertical sectional view, parts being shown in elevation, of a vacuum evaporator in accordance with the invention;

Fig. 2 is a sectional view taken along the line 2—2 of Fig. 1;

Fig. 3 is a plan view of an inversion and holding tank embodying the principles of the invention;

Fig. 4 is a longitudinal sectional view, parts being shown in elevation, taken along the line 4—4 of Fig. 3;

Fig. 5 is a transverse sectional view taken along the line 5—5 of Fig. 3;

Fig. 6 is a right-hand view of the apparatus shown in Figs. 3 through 5, the end wall of the holding tank being removed to show interior construction;

Fig. 7 is an enlarged detail view of one of the agitator blades;

Fig. 8 is an enlarged detail view of one form of agitator;

Fig. 9 is an end view of a modified form of agitator;

Fig. 10 is a detail view of one of the blades of the agitator shown in Fig. 9; and Fig. 11 is an enlarged cross-sectional view of the overflow outlet of the inversion tank.

Referring particularly to Figs. 1 and 2 of the drawings, there is shown a vacuum evaporator in the form of an elongated, enclosed, horizontal tank 20. The tank is jacketed to provide a space 21 around the bottom for the circulation of a heating fluid, such as steam or hot water, which may be introduced to the space through inlet pipe 22 and removed therefrom by way of outlets 23. The rib 24 is perforated as at 24' to permit free circulation of the heating medium. It will be understood that other convenient heating means, such as electric heating coils, may be provided, if desired.

Flanged pipes 25 communicate with the interior of the evaporator and are connected to a barometric condenser or other evacuating device (not shown) for creating and maintaining in the interior of the evaporator a desired degree of vacuum.

Jam materials to be concentrated, which have been previously mixed and which may comprise, for example, water, sugar, berries, pectin, acid, and the like, are fed into the evaporator through an inlet pipe 26. The concentrated material is withdrawn through outlet pipe 27. The level of the mixture in the evaporator is maintained, as by regulation of the outlet valve 28, at or slightly above the tops of the agitator blades 29, the construction of which blades will be described in greater detail hereinafter. The blades are carried by a horizontal agitator shaft 30 supported at one end in a bearing 31 and at the other end in a journal 32. The left-hand end of the shaft is connected to any suitable power source (not shown) and is rotated thereby at the desired speed. A stuffing box 33 is provided at the point where the shaft passes through the wall of the tank to insure a tight sliding joint.

Manholes 34 may be located at the top of the evaporator as shown or on the sides and are provided with removable, gas-tight covers giving access to the interior of the evaporator for cleaning purposes. A drain 35 having a valve 36 is used for removing wash water during clean-outs.

The level of the mixture in the evaporator may be observed and controlled through a suitable sight glass positioned in an end wall of the tank.

Turning now to Figs. 3 through 6, there is shown an inversion tank together with an integral holding tank in accordance with the invention. The inversion tank 37 is an elongated horizontal tank divided into three or more communicating sections by longitudinally extending vertical baffles 38 and 39. Section 40 communicates with section 41 through an opening 42 between the right-hand end of the baffle 38 and the end wall 43 of the inversion tank. Section 41 communicates with section 44 through an opening 45 between the left-hand end of baffle 39 and the end wall 46 of the tank. Jam or jelly liquor or the like to be inverted is fed into the inversion tank at the closed end of section 40 and flows through the tank in a zig-zag course through sections 40, 41 and 44 and is taken out of the tank by means to be described at the closed end of section 44.

The inversion tank has a jacket providing a space 47 for the circulation of a heading medium for heating the contents of the tank to the proper inversion temperature. The heating medium, which may be steam, is supplied to the space through pipes 48 and condensed steam is withdrawn through pipe 49, as best seen in Fig. 6; or water at a predetermined temperature may be used.

Longitudinal horizontal agitators 50 are positioned one in each of the tank sections 40, 41, and 44. The agitators include blades 51 mounted on shafts 52, the shafts extending through stuffing boxes 53 on the end wall 46 of the tank and being driven by suitable power means (not shown) at the desired rotational speed. The inner ends of the shafts 50 are supported in bearings 54, which, as clearly shown in Fig. 6, have a U-shaped seat open at the top so that the end of the shaft may be readily lifted from the bearing. In operation, the weight of the shaft holds it in the bearing and lubrication is provided by the materials being processed.

An enlarged detail view of the agitator 50 is shown in Fig. 8. The agitator shaft 52 has a joint near the end of the left-hand blades including a tongue 55 on the short shaft section embraced by the yoke arms 56 on the long shaft section, the joint having a bolt 57 about which the long shaft section may be pivoted relative to the short section of the shaft. With this construction, it is possible, in cleaning the machine when it has been shut down, to swing the long section of the agitator shaft to a raised or nearly vertical position, thus clearing the tank for ready access in the cleaning operation. Moreover, such jointed construction makes it a relatively simple matter to remove and replace the agitators; when the shaft is articulated at the joint, the short end of the shaft is easily passed through the stuffing box 53 and, thereafter, the end of the long shaft section may be dropped into its bearing 54.

Referring to Fig. 7, showing a detailed view of one of the agitator blades, the blade 51 is formed from sheet stainless steel stock to avoid corrosion and contamination difficulties. The inner edge 58 of the blade is affixed to the shaft 52 and the blade is solid for about one-third of its area extending outwardly from the shaft. The outer two-thirds of the blade is slotted at spaced intervals to provide relatively long thin radially extending fingers 59. As best seen in Fig. 5, the ends of the fingers 59 are slightly curved in the direction of rotation of the agitator for the purpose of engaging the fruit in the mixture being processed and carrying it down into the syrup. The fruit has a tendency to float until it is thoroughly saturated with the syrup and the particular construction of the agitator blades insures that the fruit is repeatedly immersed and held immersed in the syrup.

In the evaporator shown in Figs. 1 and 2, the blades 29 have the same fingered construction as the blades 51 of the inversion apparatus and perform a similar office in that apparatus. It will be seen that the blades are disposed in groups of three axially of the agitator shaft and that adjacent groups of blades are arranged in slightly overlapping relation so that there are no gaps in the zone of agitation. It will also be seen that the blades of each group are symmetrically disposed arcuately of the shaft and that adjacent groups of blades are angularly offset with respect to each other. However the shaft may be provided with groups of more than three blades if only a specific product is to be produced.

In the inversion tank of Figs. 3 through 6, provision is made for processing not only jams and marmalades, wherein the agitators are of the type shown in Figs. 7 and 8 and are positioned as shown in Figs. 3 through 6, but also for processing or inverting clear jelly liquors. For the latter purpose, agitators of the type shown in Figs. 9 and 10 are advantageously substituted for those previously described and the modified agitators are mounted on elevated axes near the surface of the jelly liquors. Their purpose is not so much one of mixing, for the clear jelly liquors need little or no active agitation, as one of coagulating, wetting and moving the scum which forms during the processing.

One of the jelly agitator blades 60 is shown in Fig. 10. It is formed from stainless steel sheet stock and is generally rectangular in plan having a V-shaped notch 61 cut about two-thirds of the way through the blade at its mid point. The blades may be of approximately the same length as the blades 51 of Fig. 7 but are somewhat narrower in the radial sense, being about two-thirds as wide in this dimension. They are mounted upon an agitator shaft 62, as shown in Fig. 9, and are arranged in overlapping, angularly offset groups in the manner of the construction previously described and particularly shown in Fig. 8. The V-notches 61 are at the outer edges of the blades and the blades are not curved in the direction of rotation of the agitator but stand out exactly radially. Of course, the shaft 62 may be jointed to facilitate installation and cleaning. While solid blades with V-notches are shown, other types of agitator blades can be used which will perform the service as the solid blades and permit the wetting and moving of the scum.

An elevated set of stuffing boxes 63 are provided at the left end of the inversion tank. These are normally plugged or capped, as at 64, when jams are processed, but the caps are removable and may be used for plugging the lower stuffing boxes 53 when jelly is being made. The bearings 54 at the right of the inversion tank may be unbolted from the positions shown and raised to and bolted in an elevated position in axial alignment with the stuffing boxes 63 so that the jelly agitator will rotate therein on a horizontal axis.

Assembly of the jelly agitators in the inversion apparatus and the cleaning thereof are done in the manner already described with reference to the jam agitators.

At the right-hand end of the inversion tank, as seen in Figs. 3 and 4, there is located a holding tank 65 for receiving and temporarily storing processed foodstuff from the inversion tank. From the holding tank, finished jam, jelly or the like is drawn and filled into suitable containers for shipment and ultimate consumption.

The holding tank shown is integral with the inversion tank and is preferably rectangular in horizontal cross-section and has a bottom 66 sloping downwardly from right to left as seen in Fig. 6. It is fitted with a removable agitator 67 driven by a shaft 68 from the power source (not shown). When jams or other solids-containing foodstuffs are being processed, the agitator is used to prevent stratification in the holding tank; it is usually omitted when processing jelly. The holding tank has a valved discharge conduit 69 leading to a suitable filling machine.

Two devices are provided for passing processed foodstuffs from the inversion tank to the holding tank. The first of these is a valve 70, shown in enlarged sectional detail in Fig. 11; the second will be described hereinafter.

Valve 70 is employed for running jams and the like from the inversion tank to the holding tank. It provides an overflow passage for the solids-containing liquors that eliminates any tendency for segregation of the solid and liquid components of the food. The valve has a cylindrical sleeve 71 having a flanged base 72 welded or otherwise attached to the end wall 43 of the inversion tank about a circular orifice 73 formed in the wall. The sleeve has an opening 74 on its under side. Fitted within the sleeve is a cylindrical plug 75 having an opening 76 corresponding to the opening 74 in the sleeve. The plug has a sliding fit in the sleeve and may be rotated to open and close the valve gate formed by the registry of openings 74 and 76. The rate of out-flow of the jam from the valve 70 may be regulated by the valve so that the level of material in the inversion tank is held at about the level of the axis of the valve, thereby insuring that a uniform mixture is bled from the inversion tank and that no segregation occurs.

When processing jelly, an inverted siphon is employed for transferring inverted jelly to the holding tank. This siphon includes a bent pipe section 77 leading downwardly from the bottom of the inversion tank to a valved crosspipe 78 connecting with a riser 79 fitted at the top with a short length of pipe 80 extending into the holding tank. A vertical extension 81 is pivoted to pipe 80 at the joining elbow and has an outlet 82. The extension 81 may be swung, as indicated by the arrow in Fig. 4, to adjust the level of the outlet 82 and thus to control the level of liquor in the inversion tank.

For clean-out purposes, all compartments of the apparatus may be drained into the holding tank 65. A capped opening 83 serves for draining the contents of the inversion tank into the holding tank. The inverted siphon is drained into the holding tank through valved pipe 84. A main drain 85 is provided at the lowest point of the holding tank for emptying the latter. It is thus apparent that the apparatus may be readily and thoroughly cleaned by draining and flushing for quickly shutting down operations or changing from one type of product to another.

It is believed that the operation of the apparatus is evident from the description already given. It may be stated, however, that the invention provides improved apparatus for the processing of foodstuffs generally in large scale continuous operations.

Various changes may be made in the specific construction of the apparatus in the light of the present disclosure. For example, the shape of the evaporator or inversion tank and the size and shape of the agitator blades may be varied in accordance with quantities and character of the foodstuffs being processed; also, the height of the agitators may be raised or lowered to secure agitation effective to produce a uniform product as distinguished from a product of average quality.

I claim:

1. In apparatus for processing fluent foods containing suspended solids, a tank, and a rotatable agitator in said tank, said agitator comprising a horizontal shaft and a plurality of substantially radially disposed sheet-like agitator blades carried by said shaft, each of said sheet-like agitator blades being in substantial contact with the shaft along a line extending for a substantial distance in the axial direction of the shaft, said blades having continuous surfaces extending outwardly from the shaft to the outer ends of the blades, the outer ends of said blades being slotted to provide a plurality of longitudinally spaced, substantially parallel, flat fingers, said fingers being curved in the direction of rotation of said shaft.

2. In apparatus for processing fluent foods containing suspended solids, a horizontal tank, and a rotatable agitator in said tank, said agitator comprising a horizontal shaft and a plurality of substantially radially disposed rectangular sheet-like agitator blades carried by said shaft, each of said sheet-like agitator blades being in substantial contact with the shaft along a line extending for a substantial distance in the axial direction of the shaft, said blades having continuous surfaces extending outwardly from the shaft to the outer ends of the blades, the outer ends of said blades being slotted to provide a plurality of longitudinally spaced, substantially parallel, flat fingers, said fingers being curved in the direction of rotation of said shaft.

3. In apparatus for processing fluent foods containing suspended solids, a horizontal tank, and a rotatable agitator in said tank, said agitator comprising a horizontal shaft and a plurality of substantially radially disposed rectangular sheet-like agitator blades carried by said shaft, each of said sheet-like agitator blades being in substantial contact with the shaft along a line extending for a substantial distance in the axial direction of the shaft, said blades having continuous surfaces extending outwardly from the shaft to the outer ends of the blades, the outer ends of said blades being slotted to provide a plurality of longitudinally spaced, substantially parallel, flat fingers, said fingers being curved in the direction of rotation of said shaft, said blades being disposed along the shaft in groups, the blades of each group being equal in number to the blades of each other group and being evenly arranged about the circumference of said shaft, adjacent groups of blades being angularly displaced with respect to each other and arranged in overlapping relation.

4. In apparatus for processing fluent foods, a horizontal tank having an open top, a horizontal agitator in said tank, said agitator comprising a horizontal shaft passing through one wall of said tank, journal means rotatably supporting said shaft in said one wall, a U-shaped bearing carried by an opposite wall of said tank supporting the end of said shaft, and pivotal joint means in said shaft located interiorly of said tank and near said journal means, whereby when said shaft is disengaged from said bearing it may be rotated upwardly about said joint to an elevated position facilitating cleaning of the agitator and tank.

5. In apparatus for processing fluent foods, a horizontal tank, a horizontal agitator in said tank, said agitator comprising a horizontal shaft passing through one wall of said tank, first journal means rotatably supporting said shaft in said one wall, a bearing carried by an opposite wall of said tank supporting the end of said shaft, means removably supporting said bearing in position, second journal means for said shaft positioned in said one wall above said first journal means, removable closure means for said second journal means, and second means for removably supporting said bearing in an elevated position horizontally aligned with said second journal means.

6. An agitator assembly comprising a horizontal shaft and a plurality of substantially radially disposed sheet-like agitator blades carried by said shaft, each of said sheet-like agitator blades being in substantial contact with the shaft along a line extending for a substantial distance in the axial direction of the shaft, said blades having continuous surfaces extending outwardly from the shaft to the outer ends of the blades, the outer ends of said blades being slotted to provide a plurality of longitudinally spaced, substantially parallel, flat fingers, said fingers being curved in the direction of rotation of the shaft.

GUSTAVE T. REICH.

REFERENCES CITED

The following references are of record in the file of this patent:

UNITED STATES PATENTS

| Number | Name | Date |
| --- | --- | --- |
| 202,979 | Bates | Apr. 30, 1878 |
| 225,213 | Dieryke | Mar. 9, 1880 |
| 641,835 | Burk | Jan. 23, 1900 |
| 739,688 | Laprade | Sept. 22, 1903 |
| 1,045,916 | Twining | Dec. 3, 1912 |
| 1,150,213 | Little | Aug. 17, 1915 |
| 1,391,057 | Holmstrom | Sept. 20, 1921 |
| 1,556,365 | Smith | Oct. 6, 1925 |
| 1,790,115 | Sells | Jan. 27, 1931 |
| 2,351,361 | Ockrant et al. | June 13, 1944 |
| 2,353,784 | Reich | July 18, 1944 |
| 2,428,481 | Wagner | Oct. 7, 1947 |